(12) United States Patent
Kayane et al.

(10) Patent No.: US 6,277,966 B2
(45) Date of Patent: Aug. 21, 2001

(54) AZO-COMPOUNDS AND DYE POLARIZING FILMS CONTAINING THEM

(75) Inventors: Yutaka Kayane, Ikoma; Akihiro Taguma, Takatsuki; Narutoshi Hayashi, Toyonaka, all of (JP)

(73) Assignee: SumitomoChemical Company, Ltd., Osaka (JP)

( * ) Notice: Subject to any disclaimer, the term of this patent is extended or adjusted under 35 U.S.C. 154(b) by 0 days.

(21) Appl. No.: 09/736,375

(22) Filed: Dec. 15, 2000

(30) Foreign Application Priority Data

Dec. 24, 1999 (JP) .................................................. 11-366979

(51) Int. Cl.[7] .......................... C09B 31/043; C09B 31/18; G02B 5/30

(52) U.S. Cl. .......................... 534/811; 534/829; 252/585; 359/491

(58) Field of Search ..................................... 534/811, 829; 252/585; 359/491

(56) References Cited

FOREIGN PATENT DOCUMENTS 1-172906    7/1989    (JP) .

OTHER PUBLICATIONS

Colour Index, Third Edition, 1971, vol. 4, p. 4340, C.I. 36200.*

* cited by examiner

Primary Examiner—Fiona T. Powers
(74) Attorney, Agent, or Firm—Stevens Davis Miller &Mosher, L.L.P.

(57) ABSTRACT

An azo-compound, free acid form of which is represented by the following formula (I):

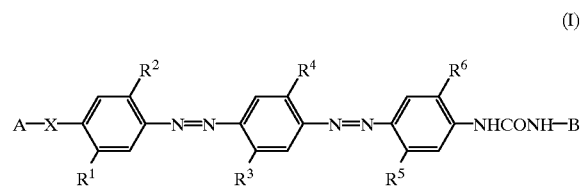

wherein A and B represent, independently with each other, a phenyl having one or two groups selected from sulfo and carboxyl or a naphthyl having 1 to 3 sulfos; $R^1$, $R^2$, $R^3$, $R^4$, $R^5$ and $R^6$ represent, independently with each other, hydrogen, lower alkyl or lower alkoxy; and X represents —N=N— or —NHCO—, and a dye polarizing film containing the azo-compound in a polarizing film base, which exhibits a high polarizing performance and is excellent in durability and light fastness, are provided.

7 Claims, No Drawings

AZO-COMPOUNDS AND DYE POLARIZING FILMS CONTAINING THEM

BACKGROUND OF THE INVENTION

The present invention relates to azo-compounds useful as dyes, particularly as yellow dyes for polarizing films. The present invention also relates to polarizing films containing the azo-compound.

Polarizing films are produced by causing a polarizing film base, such as a stretch-oriented polyvinyl alcohol film or a polyene film which is produced by dehydrochlorination of a polyvinyl chloride film or dehydration of a polyvinyl alcohol film to form a polyene followed by an orientation of them, to contain iodine or a dichroic dye as a polarizing element. Among them, Iodine-based polarizing films are superior in the early polarizing performance. However, they have problems that they are inferior in durability against heat or water and thus their performance is lowered under high temperature-high humidity conditions In order to improve such durability, a method which include a treatment with an aqueous solution containing formaldehyde or boric acid, a method in which a high molecular film with a low permeability to water vapor is used as a protective film and other methods have been proposed. These methods, however, are not satisfactory.

On the other hand, while dye-based polarizing films in which a dichroic dye is used as a polarizing element are superior in durability against heat and water as compared to iodine polarizing films. However, they are generally inferior in early polarizing performance. Therefore, in order to improve the polarizing performance of dye-based polarizing films, various studies have been conducted on dyes to be used. For example, JP-A-1-172906 describes a polarizing film using a specific azo-compound as a yellow dye. The above polarizing film containing such an azo-compound, however, has not fully met the demands of consumers.

An object of the present invention is to provide yellow compounds suitable for the production of polarizing films having high performance. Another object of the present invention is to provide polarizing Elms with high performance, particularly polarizing films with high performance for liquid crystal projectors, using these compounds.

The present inventors have conducted studies to develop compounds which are good in dyeing ability in the production of polarizing films, which are excellent in polarizing performance and which are excellent in durability and light fastness under high temperature-high humidity conditions, when used as dyes for polarizing films. In addition, they have also conducted studies to develop compounds suitable for dyes which cover a region of comparatively short wavelength of 400 to 500 nm and are used in polarizing films produced by adsorbing two kinds or more of dichroic dyes on a high molecular film and orientating the film. As the result, they have found that specific azo-compounds are suitable for attaining the above objects Thus, the present invention was completed.

SUMMARY OF THE INVENTION

The present invention provides an azo-compound, free acid form of which is represented by the following formula

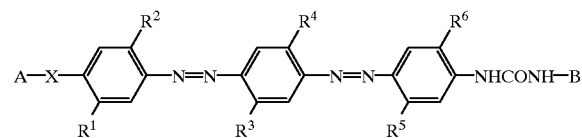

(I)

wherein A and B represent, independently with each other, a phenyl having one or two groups selected from sulfo and carboxyl or a naphthyl having 1 to 3 sulfo;

$R^1$, $R^2$, $R^3$, $R^4$, $R^5$ and $R^6$ represent, independently with each other, hydrogen, lower alkyl or lower alkoxy: and X represents —N=N— or —NHCO—.

In addition, the present invention provides a dye-based polarizing film containing said azo-compound in a polarizing film base.

MODE FOR CARRYING OUT THE INVENTION

In the formula (I), A and B may be same to or different from each other, and are phenyl or naphthyl. The phenyl is substituted with one or two groups selected from sulfo and carboxyl. The naphthyl has 1 to 3 sulfo groups. Examples of the phenyl represented by A or B include 2-, 3- or 4-sulfophenyl, 2-, 3- or 4-carboxyphenyl, 2,4- or 2,5-disulfophenyl, 3,5-dicarboxyphenyl and 2-carboxy-4- or 5-sulfophenyl. Examples of the naphthyl represented by A or B include 5-, 6-, 7- or 8-sulfo-2-naphthyl, 4-, 5-, 6- or 7-sulfo-1-naphthyl, 6,8-, 4,8-, 5,7- or 3,6-disulfo-2-naphthyl, 3,6- or 4,6-disulfo-1-naphthyl and 3,6,8- or 4,6,8-trisulfo-2-naphthyl.

Among the phenyl represented by A and B, monosulfophenyl having one sulfo is preferred. Among the naphthyl, disulfonaphthyl having two sulfo groups, in particular disulfo-2-naphthyl, is preferred.

$R^1$, $R^2$, $R^3$, $R^4$, $R^5$ and $R^6$ represent lower alkyl or lower alkoxy. $R^1$, $R^2$, $R^3$, $R^4$, $R^5$ and $R^6$ may be same to or different from each other. The lower alkyl and lower alkoxy here may have about 1 to 4 carbon atoms, respectively Specific examples of the lower alkyl include methyl, ethyl and propyl. Specific examples of the lower alkoxy include methoxy, ethoxy and propoxy. As a group represented by $R^1$, $R^2$, $R^3$, $R^4$, $R^5$ or $R^6$, hydrogen, methyl or methoxy is preferred from the viewpoint of dichroism.

The azo-compound represented by the formula (I) can be produced, for example, by a process described below. Thus, an aromatic amine compound represented by the following formula (II):

NH$_2$—B    (II)

wherein B has the same meaning as above, is first reacted with phenyl chlorocarbonate according to the conventional method to give a carbamate compound represented by the following formula (III):

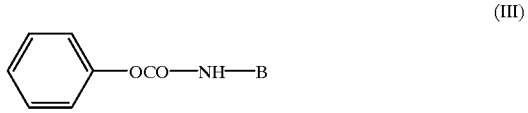

(III)

wherein B has the same meaning as above. Then, the carbameate compound thus obtained is reacted with an azo-intermediate compound represented by the following formula (IV):

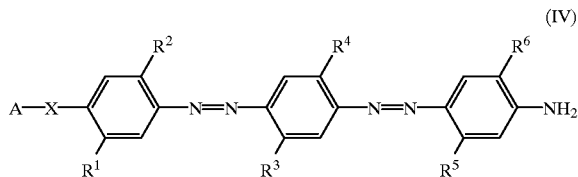

wherein A, X, $R^1$, $R^2$, $R^3$, $R^4$, $R^5$ and $R^6$ have the same meaning as above,
   at 20 to 60° C. in an aqueous solvent to obtain an azo-compound of the formula (I).

The azo-intermediate compound of the formula (IV) can be produced by repeating the conventional coupling reaction on an aniline compound or a naphthylamine compound which may have a substituent such as those represented by $R^1$, $R^2$, $R^3$, $R^4$, $R^5$ or $R^6$, amino, sulfo and carboxyl.

The azo-compound represented by the formula (I) obtained in this manner may exist either in the form of the free acid or in the form of a salt. Examples of the salt include alkali metal salts such as lithium salt, sodium salt and potassium salt; ammonium salt; organic amine salts such as ethanolamine salt and alkylamine salts. On using the compound In a polarizing film base, the compound in the form of a sodium salts is usually preferred.

When a polarizing film is produced by causing a polarizing film base to contain the azo-compound represented by the formula (I), modification of hue or improvement of polarizing performance can be effected by co-using another organic dye. The organic dye used in this case may be any dye insofar as it has a high dichroic property. For producing a polarizing film suitable for liquid crystal projectors, a dye superior in light fastness is preferably selected.

The dye polarizing film of the present Invention can be produced by causing a high molecular film as a polarizing film base to contain a dichroic dye comprising a compound of the formula (I) according to the known method. The dichroic dye may further comprise another organic dye, as described above. Examples of the high molecular film include those made of polyvinyl alcohol resin, polyvinyl acetate resin, ethylene/vinyl acetate (EVA) resin, nylon resin and polyester resin. Examples of the polyvinyl alcohol resin here include polyvinyl alcohol itself which is a partial or complete hydrolysis product of polyvinyl acetate, and saponification products of copolymers of vinyl acetate and another polymerizable monomer, such as saponified EVA resin. Examples of said another polymerizable monomer include olefins such as ethylene and propylene, unsaturated carboxylic acid such as crotonic acid, acrylic acid, methacrylic acid and maleic acid, unsaturated sulfonic acids, and vinyl ethers. Further, polyvinyl formal and polyvinyl acetal which are modification product of polyvinyl alcohol with an aldehyde, can be included in the polyvinyl alcohol resin. As the polarizing film base, films derived from a polyvinyl alcohol compound, particularly polyvinyl alcohol film, are suitably used from the viewpoint of adsorbing performance and orientation performance of the dye.

For causing such a high molecular film to contain a dichroic dye, a usual method for dyeing the high molecular film can be adopted. The dyeing can be carried out, for example, by the following manner. First, a dye bath is prepared by dissolving a dichroic dye in water. The concentration of the dye in the dye bath is not particularly limited, but usually selected within a range of 0.0001 to 10% by weight. In addition, a dyeing assistant may be used if necessary For example, use of 1 to 10% by weight of sodium sulfate in a dye bath is suitable. A high molecular film is dyed by dipping it in a dye bath prepared in this manner. The temperature for dyeing is preferably 40 to 80° C. The orientation of the dichroic dye is performed by stretching the high molecular film. Any known method for such a stretching process may be adopted For example, wet method and dry method can be adopted The orientation of the high molecular film may be carried out before or after dyeing.

The high molecular film containing a dichroic dye and orientated Is subjected to post-treatment, such as boric acid treatment according to the known method, if necessary. Such a post-treatment is conducted for improving the light-transmittance, polarity and durability of the polarizing film. Although the suitable conditions for the boric acid treatment vary depending on the kind of high molecular film to be used and the kind of dye to be used. generally the boric acid concentration is within a range of 1 to 15% by weight, preferably 5 to 10% by weight, in aqueous boric acid solution, and the temperature range is from 30 to 80° C., preferably from 50 to 80° C. In addition, a fixing treatment with an aqueous solution containing a cationic high molecular compound may be conducted simultaneously, If necessary.

A polarizing plate can be produced by attaching a protective film having high optical transparency and mechanical strength on one or both sides of the dye-based polarizing film obtained according to the above manner. Materials forming the protective film may be those conventionally used. Example thereof include cellulose acetate film and acrylic film as well as films of a fluorine resin such as tetrafluoroethylene/hexafluoropropylene copolymer, polyester film, polyolefin film and polyamide film.

The present invention will now be described in more detail in reference to Examples, which are for illustration purpose only and should not be construed as a limitation upon the scope of the invention in any way. In Examples, % and part are weight-based unless otherwise specified.

EXAMPLE 1

Into 100 parts of water was dissolved 8 parts of sodium sulfanilate. Adjusting pH to 7 to 8 with 15% aqueous sodium carbonate solution. 8 parts of phenyl chlorocarbonate was added dropwise over 30 minutes at a temperature of 20 to 25° C. After stirring at the same temperature and the same pH for 1 hour, precipitated crystals were filtered to give an intermediate represented by the following formula (1):

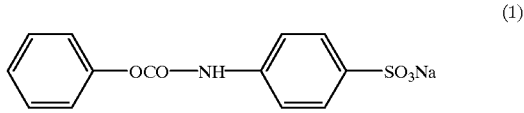

The total amount of the obtained intermediate and 7 parts of a trisazo-intermediate compound represented by the following formula (2):

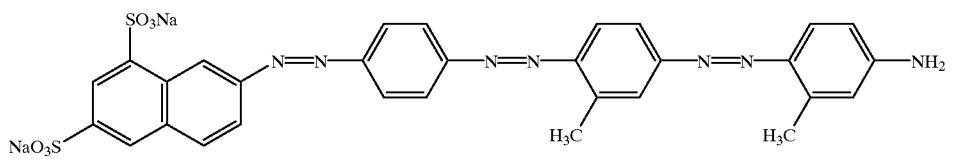

(2)

were added to a mixed solution of 100 parts of water and 100 parts of N-methylpyrrolidone. The resulting mixture was stirred at a temperature of 40 to 45° C. for 3 hours while adjusting pH to 8 to 9 with 15% aqueous sodium carbonate solution. After removing insoluble matters by filtration, 300 parts of ethanol was added to the filtrate to precipitate crystals. The precipitated crystals were filtered, and the obtained cake was re-dissolved in a mixed solution of 220 parts of water and 80 parts of N-methylpyrrolidone To this solution, 30 parts of sodium chloride was added and precipitated crystals were filtered to give a trisazo-compound, represented by the following formula (Ia), which showed a λmax of 419 nm in an aqueous medium.

stirred at a temperature of 40 to 45° C. for 5 hours while adjusting pH to 8 to 9 with 15% aqueous sodium carbonate solution. After removing insoluble matters by filtration, 300 parts of ethanol was added to the filtrate to precipitate crystals. The precipitated crystals were filtered, and the obtained cake was re-dissolved in a mixed solution of 100 parts of water and 100 parts of N-methylpyrrolidone. To this solution, 200 parts of ethanol was added and precipitated crystals were filtered to give a diazo-compound, represented by the following formula (Ib), which showed a λmax of 404 nm in an aqueous medium.

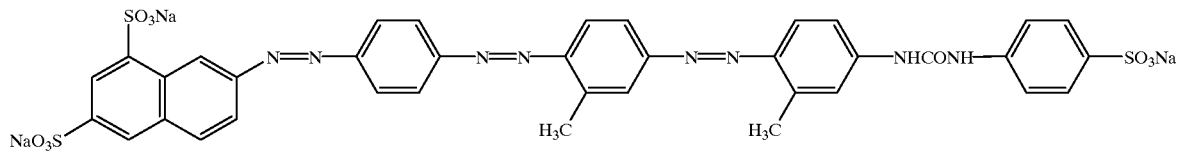

(Ia)

EXAMPLE 2

The total amount of the intermediate represented by the formula (I) obtained in the same manner as that in the first half of Example 1 and 7 parts of a diazo-intermediate compound represented by the following formula (3):

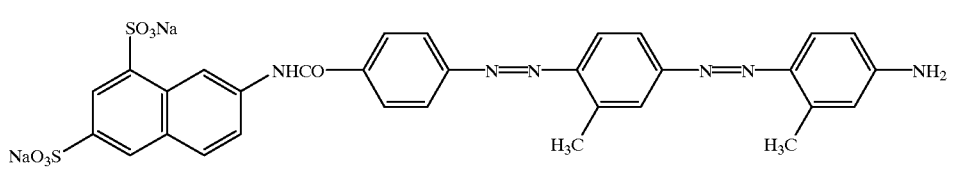

(3)

were added to a mixed solution of 100 parts of water and 100 parts of N-methylpyrrolidone. The resulting mixture was

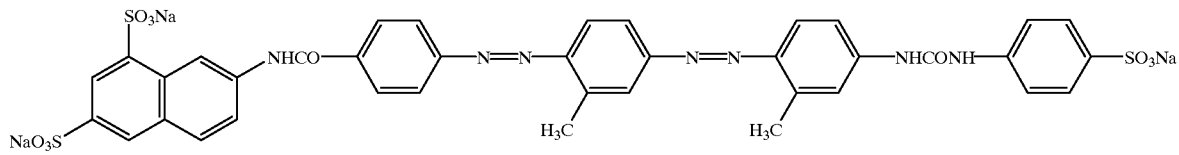

(Ib)

EXAMPLE 3

To 150 parts of water was added 12 parts of 2-aminonaphthalene-6,8-disufonic acid. After adding 20% aqueous sodium hydroxide solution to adjust the pH to 7 for dissolution, 7 parts of phenyl chlorocarbonate was added thereto dropwise over 30 minutes at a temperature of 20 to 25° C. while adjusting pH to 7 to 8 with 15% aqueous sodium carbonate solution. After stirring at the same temperature and the same pH for 1 hour, insoluble matters were filtered to give an aqueous solution of an intermediate represented by the following formula (4):

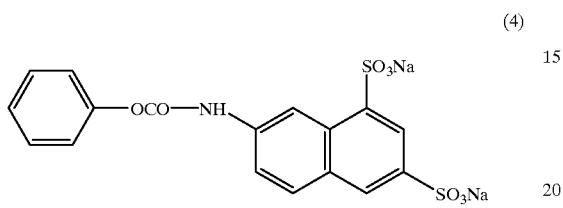

(4)

To the total amount of the obtained aqueous solution of the intermediate were added 5 parts of a trisazo-intermediate compound represented by the following formula (5):

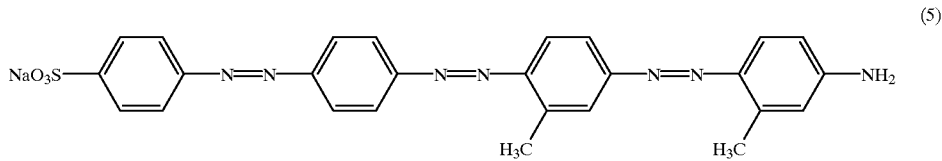

(5)

and 150 parts of Nmethylpyrrolldone. After stirring the resulting mixture at a temperature of 40 to 45° C. for 4 hours while adjusting pH to 8 to 9 with 15% aqueous sodium carbonate to solution, 300 parts of ethanol was added to the reaction solution to precipitate crystals. The precipitated crystals were filtered, and the obtained cake was re-dissolved in a mixed solution of 30 parts of water and 70 parts of N-methylpyrrolldone. To this solution, 100 parts of ethanol was added and precipitated crystals were filtered to give a trisazo-compound, represented by the following formula (Ic) which showed a λmax of 413 nm in an aqueous medium.

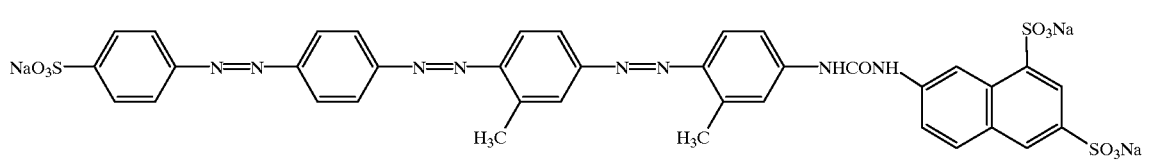

(Ic)

EXAMPLE 4

By repeating the same procedure as that in Examples 1 to 3 except that the raw materials were changed, azo-compounds represented by the following formulae (Id), (Ie), (If) and (Ig) were obtained.

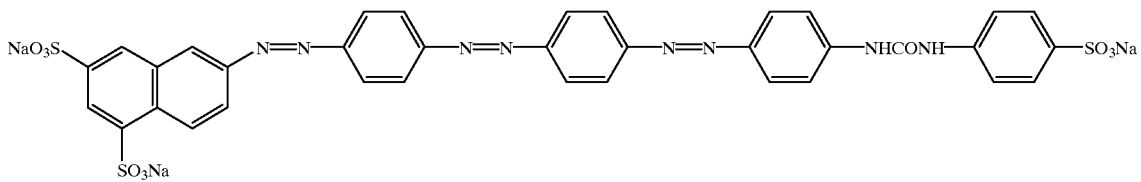

(Id)

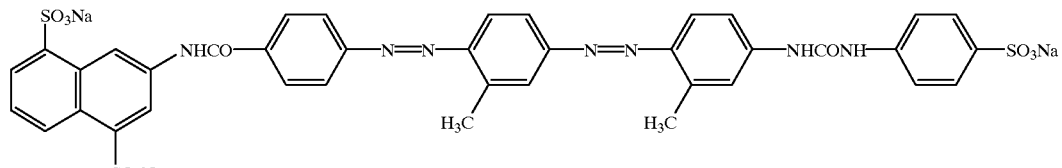

(Ie)

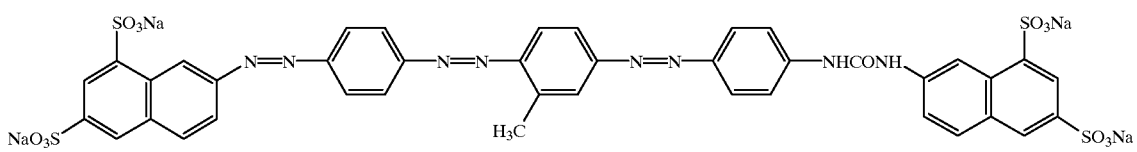

(If)

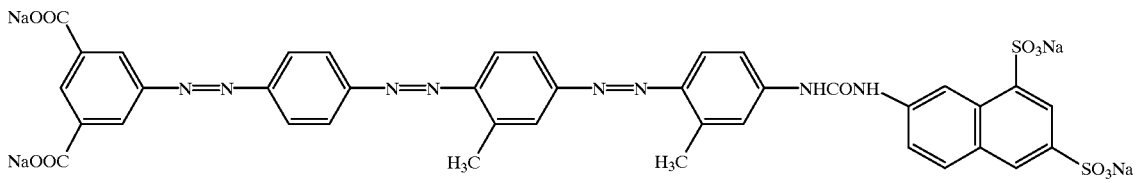

(Ig)

These compounds showed λmax values of 420 nm, 404 nm, 419 nm and 410 nm, respectively, in an aqueous medium.

EXAMPLE 5

A polyvinyl alcohol film having a thickness of 75 μm (Kurarayvinylon # 7500, manufactured by Kuraray) was uniaxially stretched 5 times in the machine direction to give a polarizing film base. Keeping the polyvinyl alcohol film in the strained condition, the film was dipped in an aqueous solution having concentrations of 0.025% for the trisazo-compound represented by the formula (Ia) obtained in Example 1 and 2.0% for sodium sulfate as a dyeing assistant at 70° C. After subsequently dipping in 7.5% aqueous boric acid solution at 78° C. for 5 minutes, the film was taken out, washed with water at 20° C. for 20 seconds and dried at 50° C. to give a polarizing film. The obtained polarizing film had a λmax (a wavelength at which the transmission in the stretching direction of the film is minimum) of 450 nm. This polarizing film showed a high degree of polarization and a durability for a long period even in a high temperature-high humidity conditions. In addition, the film was excellent in light fastness against an exposure for a long period.

EXAMPLE 6

A polarizing film was obtained by repeating the same procedure as in Example 5 except that the azo-compound of the formula (Ia) was changed to the diazo-compound represented by the formula (Ib) obtained in Example 2 and the temperature of the dye bath and the temperature for the boric acid treatment were changed to 65° C. and 73° C., respectively. The obtained polarizing film had a λmax of 450nm. This polarizing film showed a high degree of polarization and a durability for a long period even in a high temperature-high humidity conditions. In addition, the film was excellent in light fastness against an exposure for a long period.

EXAMPLE 7

A polarizing film was obtained by repeating the same procedure as in Example 5 except that the azo-compound of the formula (Ia) was changed to the compound represented by the formula (Ic) obtained in Example 3 or the respective compounds represented by the formulae (Id), (Ie), (If) or (Ig) obtained in Example 4 The obtained polarizing films showed a high degree of polarization and were excellent in the durability for a long period in a high temperature-high humidity conditions and in the light fastness against an exposure for a long period. These polarizing films had respective λmax values as shown below.

| Azo-compound | λmax of polarizing film |
| --- | --- |
| Formula (Ic) | 450 nm |
| Formula (Id) | 450 nm |
| Formula (Ie) | 450 nm |
| Formula (If) | 450 nm |
| Formula (Ig) | 450 nm |

The azo-compounds of the present invention are useful as dyes, particularly as dyes for polarizing films. The dye-based polarizing films containing these compounds have a high polarizing performance comparable to iodine-based polarizing films and are excellent in durability and light fastness against exposure for a long period. Therefore, these are suitable for various liquid crystal displays, in particular for use in liquid crystal projectors which require a high polarizing performance and light fastness.

What is claimed is:

1. An azo-compound, free acid form of which is represented by the following formula (I):

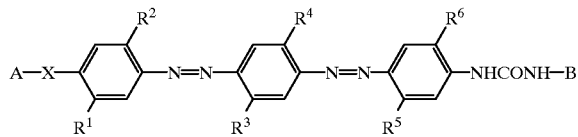

(I)

wherein A and B represent, independently with each other, a phenyl having one or two groups selected from sulfo and carboxyl or a naphthyl having 1 to 3 sulfos;

$R^1$, $R^2$, $R^3$, $R^4$, $R^5$ and $R^6$ represent, independently with each other, hydrogen, lower alkyl or lower alkoxy; and X represents —N=N— or —NHCO—.

2. The azo-compound according to claim 1, wherein at least one of A and B represent monosulfophenyl or disulfonaphthyl.

3. The azo-compound according to claim 1, wherein A and B, independently with each other, represent monosulfophenyl or disulfonaphthyl.

4. The azo-compound according to claim 2, wherein at least one of A and B represents disulfo-2-naphthyl.

5. The azo-compound according to claim 1, wherein $R^1$, $R^2$, $R^3$, $R^4$, $R^5$ or $R^6$ represent, independently with each other, hydrogen, methyl or methoxy.

6. A dye polarizing film produced by causing a polarizing film base to contain a dichroic dye comprising an azo-compound according to claim 1.

7. The dye polarizing film according to claim 6, wherein the polarizing film base is a polyvinyl alcohol film.

* * * * *